US008269637B2

(12) United States Patent
Savage, Jr.

(10) Patent No.: US 8,269,637 B2
(45) **Date of Patent: *Sep. 18, 2012**

(54) SWITCHABLE STROBE LENS

(75) Inventor: Kenneth E. Savage, Jr., Fitchburg, MA (US)

(73) Assignee: SimplexGrinnell LP, Westminster, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/195,497

(22) Filed: Aug. 1, 2011

(65) Prior Publication Data

US 2011/0279285 A1 Nov. 17, 2011

Related U.S. Application Data

(63) Continuation of application No. 12/260,728, filed on Oct. 29, 2008, now Pat. No. 8,049,632.

(60) Provisional application No. 61/060,551, filed on Jun. 11, 2008.

(51) Int. Cl.

| | |
|---|---|
| ***G08B 17/12*** | (2006.01) |
| ***G08B 5/22*** | (2006.01) |
| ***G08B 5/36*** | (2006.01) |
| ***G02F 1/01*** | (2006.01) |
| ***G02F 1/07*** | (2006.01) |

(52) U.S. Cl. ................ 340/577; 340/815.4; 340/815.55; 340/815.56; 340/815.75; 340/815.76; 340/815.77; 359/245; 359/274

(58) Field of Classification Search ........................ None
See application file for complete search history.

(56) References Cited

U.S. PATENT DOCUMENTS

| | | | | |
|---|---|---|---|---|
| 6,707,389 | B2 * | 3/2004 | Pederson | 340/815.45 |
| 7,002,720 | B2 | 2/2006 | Beteille et al. | |
| 2003/0058124 | A1 * | 3/2003 | Hsieh | 340/815.4 |
| 2004/0056773 | A1 | 3/2004 | Zimmerman et al. | |
| 2004/0085218 | A1 * | 5/2004 | Pecora | 340/815.4 |
| 2005/0128097 | A1 | 6/2005 | Piccolo, III et al. | |
| 2008/0266121 | A1 * | 10/2008 | Ellul | 340/584 |
| 2009/0091466 | A1 * | 4/2009 | Sendrowski, Jr. | 340/691.1 |
| 2009/0174566 | A1 * | 7/2009 | Volk et al. | 340/691.5 |

* cited by examiner

*Primary Examiner* — Julie Lieu
(74) *Attorney, Agent, or Firm* — Brinks Hofer Gilson & Lione

(57) ABSTRACT

An alarm system notification device that comprises a single strobe, an input selector, and a controller is disclosed. The single strobe may be configured to operate at a first wavelength band in a first configuration and at a second wavelength band in a second configuration, the first wavelength band being different from the second wavelength band. The configuration of the single strobe (either in the first or second configuration) is determined based on a command that is input by the input selector. In response to receiving the command, the controller may control the single strobe so that the single strobe is configured to operate at one of the first wavelength band in the first configuration or the second wavelength band in the second configuration as indicated in the command.

24 Claims, 6 Drawing Sheets

SWITCHABLE STROBE LENS

REFERENCE TO RELATED APPLICATIONS

This application is a continuation of U.S. application Ser. No. 12/260,728 (filed on Oct. 29, 2008 now U.S. Pat. No. 8,049,632 and published as U.S. Application Ser. No. 2009-0309740A1), which claims the benefit under 35 U.S.C. §119 of U.S. Provisional Application No. 61/060,551, filed Jun. 11, 2008. U.S. application Ser. No. 12/260,728 (published as U.S. Application Ser. No. 2009-0309740A1) and U.S. Provisional Application No. 61/060,551 are incorporated herein by reference in their entirety.

BACKGROUND

Fire alarm devices such as audible horns (audible/visible or A/V), loudspeakers (speaker/visible or S/V) and visible strobes (visible only or V/O), are referred to as "notification appliances." Typically, a fire alarm control panel (FACP) drives these devices over one or more "notification appliance circuits" (NACs). The strobes are required, for example, as an alert for the hearing-impaired, or for those in a high noise environment.

A strobe is typically made up of a high-intensity Xenon flash tube, a reflector assembly, a transparent protective dome, an electronic control circuit, a terminal block to connect the device to the NAC and a housing to install the device to a wall or ceiling.

The strobe is a notification device designed to disperse its light output in a hemispherical pattern. The light distribution must meet stringent specification for UL approval. The color of the light output may indicate different types of notification. For example, a white light output may indicate a fire emergency, whereas an amber light output may indicate an intruder on the premises (or a similar type of mass notification). Typically, the same type of strobe is used to indicate the different types of notification, with the exception of the type of lens placed on the strobe. In particular, when a strobe is designated to output white light, a clear lens is placed on the housing of the strobe. When a strobe is designated to output amber light, an amber colored lens is placed on the housing of the strobe.

When a premises has both a fire alarm and a mass notification system, the two types of strobes are installed in every location—i.e., one strobe that outputs white light and a second strobe that outputs amber light. Careful planning is required for installation so that the two strobes, which are typically mounted next to one another, do not interfere with each other. One method for proper installation of the two strobes is to use special mounting assemblies, which keep the different strobes at different elevations relative to one another. However, these mounting assemblies are rather large and cumbersome. Accordingly, a need exists for outputting both white light and amber light from strobes that is simple in design and operation.

SUMMARY

The present embodiments relate to an alarm system notification device that comprises a single strobe, an input selector, and a controller. The single strobe may be configured to operate at a first wavelength band in a first configuration and at a second wavelength band in a second configuration, the first wavelength band being different from the second wavelength band. For example, the single strobe may operate to output white light in the first configuration and to output amber light in the second configuration.

The configuration of the single strobe (either in the first or second configuration) is determined based on a command that is input by or received from the input selector. In particular, the command may include data indicative of one of the first wavelength band or the second wavelength band to operate the single strobe. In one embodiment, the input selector may comprise a communication port through which the command is received from a fire alarm control panel. The fire alarm control panel may send a command, specifically addressed to the alarm system notification device (in the event that the alarm system notification device is uniquely addressable). Or, the fire alarm control panel may send a command (as part of a broadcast command to a plurality of alarm system notification devices) (in the event that the alarm system notification device is not uniquely addressable). In another embodiment, the input selector may comprise a switch (or other type of selector) that allows for an operator to manually input the command at the alarm system notification device. The switch may be located on an external housing of the alarm system notification device so that the operator may walk to the alarm system notification device and set the switch to the desired wavelength band. Or, the selector may receive a wireless command sent from a handheld remote activated by the operator proximate to the alarm system notification device. In still another embodiment, the input selector may comprise a combination of the communication port (allowing for receiving a command from the fire alarm control panel) and the switch or other selector (allowing for manual input at the alarm system notification device).

The controller, in communication with both the input selector and the single strobe, may receive the command from the input selector to select which of the first wavelength band or second wavelength band to operate the single strobe. In response to receiving the command, the controller may control the single strobe so that the single strobe is configured to operate at one of the first wavelength band in the first configuration or the second wavelength band in the second configuration as indicated in the command. In one embodiment, the strobe includes an electrically alterable lens whereby the color of the electrically alterable lens is dependent on a control signal input to the lens. The controller, depending on the command received from the input selector, may generate the control signal to generate the desired color in the electrically alterable lens. In another embodiment, the strobe may include one or more movable or retractable lenses or filters. For example, the strobe may include a first stationary lens (such as a clear lens), and include a second movable or retractable lens (such as an amber lens). Upon receiving a command for amber light output, the controller may generate a command to move the second movable lens so that it is proximate to (such as inserted) behind the first stationary lens.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
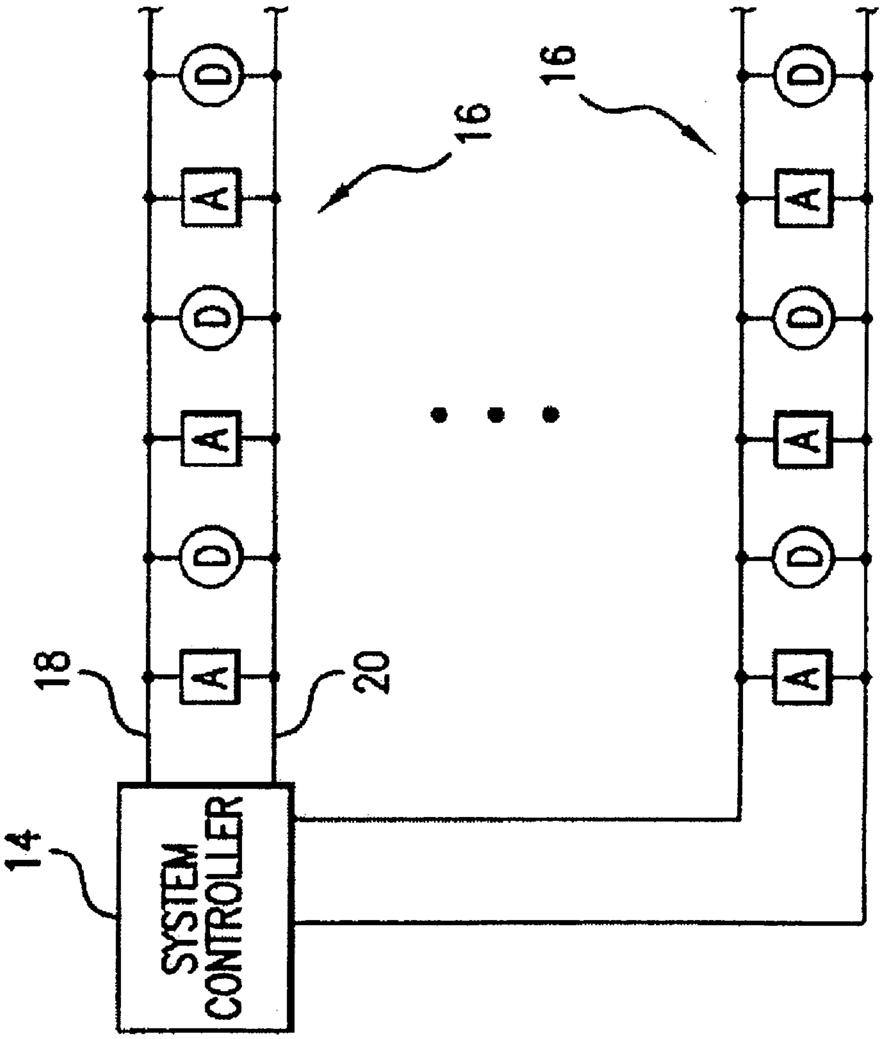
FIG. 1 is a schematic diagram illustrating a system embodying the present invention.

A system embodying one example of the present invention is illustrated in FIG. 1. The system includes one or more notification appliance circuits (NACs), i.e., networks 16, having alarm condition detectors D and alarm system notification device A. Alternatively, the detectors and notification devices may be on separate networks. A system controller (such as a fire alarm control panel (FACP)) 14 may monitor the detectors D. When an alarm condition is sensed, the system controller 14 may signal the alarm to the appropriate notification devices through one or more networks 16. Notification devices may include, for example, a visual alarm (strobe), an audible alarm (horn), a speaker, or a combination thereof.

Although not necessary for carrying out the invention, as shown, all of the notification devices in a network are coupled across a pair of power lines 18 and 20 that advantageously also carry communications between the system controller 14 and the detectors D and notification devices A.

One, some, or all of the notification devices A may comprise a single strobe, an input selector, and a controller. The single strobe may be configured to operate at a first wavelength band in a first configuration and at a second wavelength band in a second configuration, the first wavelength band being different from the second wavelength band. For example, the single strobe may operate to output white light in the first configuration and to output amber light in the second configuration.

As discussed in more detail below, the notification devices A may be programmed to operate in the first or second wavelength band either remotely or locally. For example, remotely programming the notification devices A may be accomplished using the fire alarm control panel 14. In particular, the fire alarm control panel 14 may use one or more of the following: software configuration tools; fire alarm panel displays and keypads or similar user interfaces; service port command; external computer interfaces; Internet interfaces; and modem or other remote connection interfaces. Once the wavelength band for the notification device A is configured in the fire alarm panel, the fire alarm panel may communicate the selection to the device automatically and the device may select the configured setting for output.

The command from the fire alarm panel can, for example, be multiplexed onto the device's power line, providing the added benefit that it saves the cost of additional wiring to devices. See for example, U.S. Pat. No. 6,426,697, incorporated by reference herein in its entirety. Alternatively, the communication line to the device may be separate from the power line. The communications channel may comprise, for example, a wireless link, a wired link or a fiber optic link.

As another example, the notification devices A may be locally programmed. Specifically, the notification device A may be programmed manually (without its removal) via any of a variety of means, including but not limited to: configuring a switch on the notification device A, jumpers, optical signaling (e.g. TV remote control, blinking flashlight, light bulb or other light source, laser pointers, breaking optical beam), a magnet tapped against the device, radio frequency (RF) tags, sound signaling (e.g. ultrasonic tones, touchtones) etc.

The wavelength band data may be stored and/or updated in the notification device A in a variety of ways. For example, in one embodiment, the wavelength band selection may be stored in volatile memory. The notification device A may be updated from the fire alarm control panel 14 each time the device is powered on. This may save the cost of using nonvolatile memory. Alternatively, the wavelength band selection may be stored in nonvolatile memory (retained when power lost). Nonvolatile memory includes, but is not limited to, FLASH memory, PROMS (such as EEPROMs), battery-backed RAM, battery backed electronic switches such as flip-flops or other switches, magnetic core memory, magnetic hard drives, optical media storage including but not limited to CD-ROM and DVD, and RF tags. In other embodiments, the wavelength band data is updated continuously from the fire alarm control panel 14 whenever the notification device A needs to strobe. In this embodiment, no memory may be required.

In some embodiments, the notification device A may report the wavelength band setting to the fire alarm control panel 14 using a communication signal (digital or analog). This communication signal may be multiplexed onto the device's power line, or may be on a communication line that is separate from the power line. Alternatively, a fiber optic cable link or a wireless connection can be utilized. Alternatively, or in addition, the notification device A may directly report the wavelength band setting, using for example, optical signaling (for example, an LED, an infrared emitter, a flashlight bulb or a mechanical shutter). The notification device A may also report the setting using other means, such as RF tag reading or audio (e.g., ultrasonic, chirps, beeps, prerecorded or synthesized voice, etc.)

Figure 2:
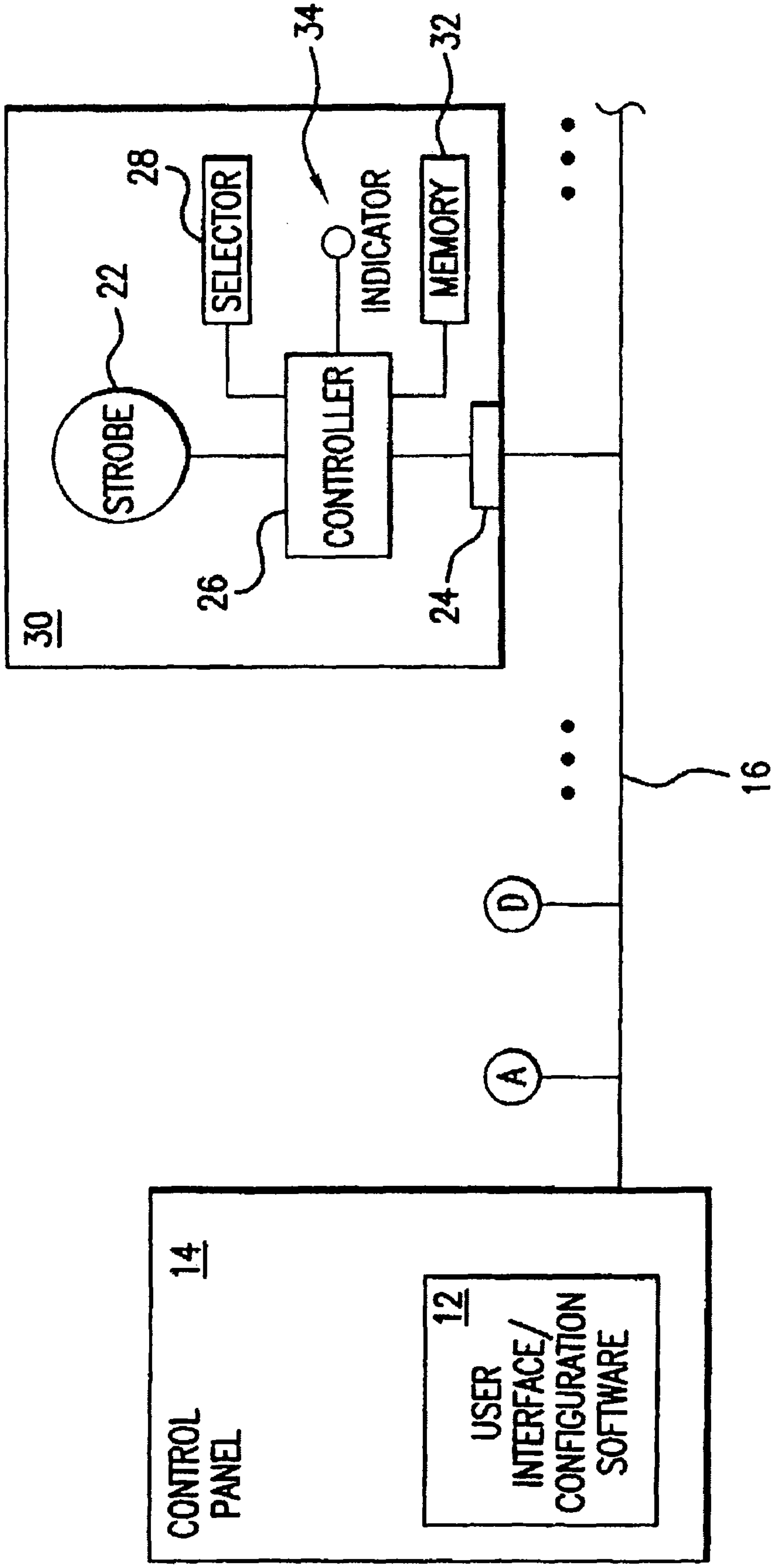
FIG. 2 is a schematic diagram of the system of FIG. 1, further illustrating details of an embodiment of the present invention.

FIG. 2 is a schematic diagram of the system of FIG. 1, further illustrating details of an embodiment of the present invention. For simplicity, the two-line network of FIG. 1 is shown with a single line 16. The control panel 14 includes a user interface and configuration software 12 which allow a user to program the wavelength band setting for individual strobe devices 30 on the network or communications channel 16.

The network 16 may include addressable detection devices D, as well as other notification devices or appliances A, which may or may not include strobes. The control panel 14 may further be programmed to change the wavelength band settings for one or more strobe devices 30 upon specific events or at certain times. In particular, the selection of the wavelength band setting may be automatically determined based on the type of notification desired. For example, if a fire emergency notification is required, the control panel 14 may correlate the type of emergency notification required (such as a fire emergency), with a particular wavelength band (such as white light). The control panel may then send a command indicating the type of wavelength band desired.

Strobe device 30 connects to the network 16 via a network interface (communication connection) 24. A controller 26, such as a microcontroller or hardwired logic, receives from and sends to the control panel 14 wavelength band configuration data. When commanded, the strobe 22 flashes at the currently configured wavelength band setting, which may be stored in a memory (volatile or non-volatile) 32. Although shown separately, the memory 32 may be integrated with the controller 26.

In some embodiments, a selector 28, such as a set of jumpers or a DIP switch, allows manual setting of the wavelength band (such as white or amber light output). In at least one embodiment, this manual setting may be overwritten upon command from the control panel 14.

In some embodiments, an indicator 34, such as a flashing LED, may indicate the currently configured wavelength band setting, for example, upon command from the control panel 14, upon a local manual command such as a pushbutton (not shown), on a periodic basis, always, or upon some other event.

Figure 3:
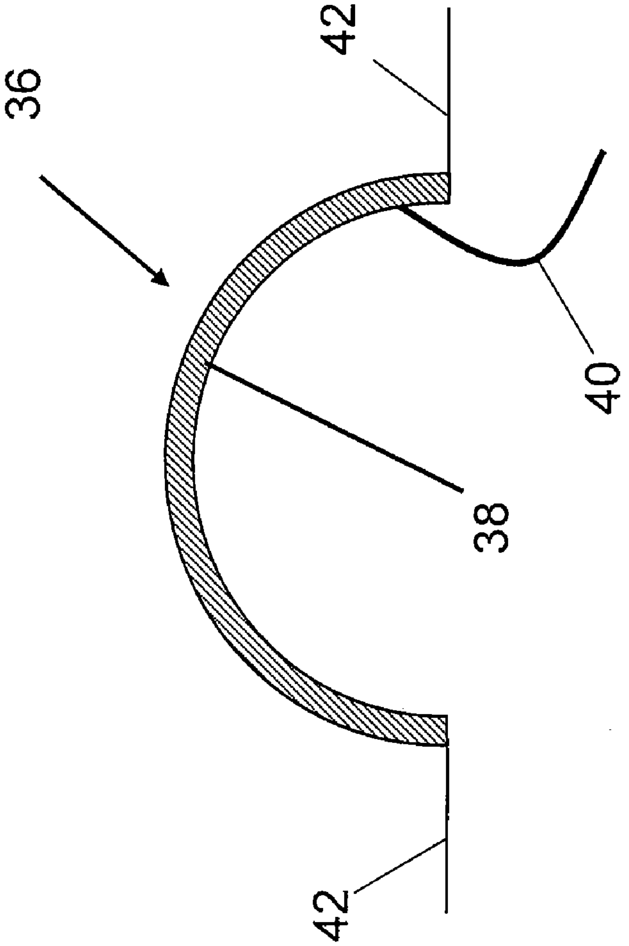
FIG. 3 illustrates using an electrically alterable lens in order to configure the strobe to operate at one of the first wavelength band or the second wavelength band.
Figure 4:
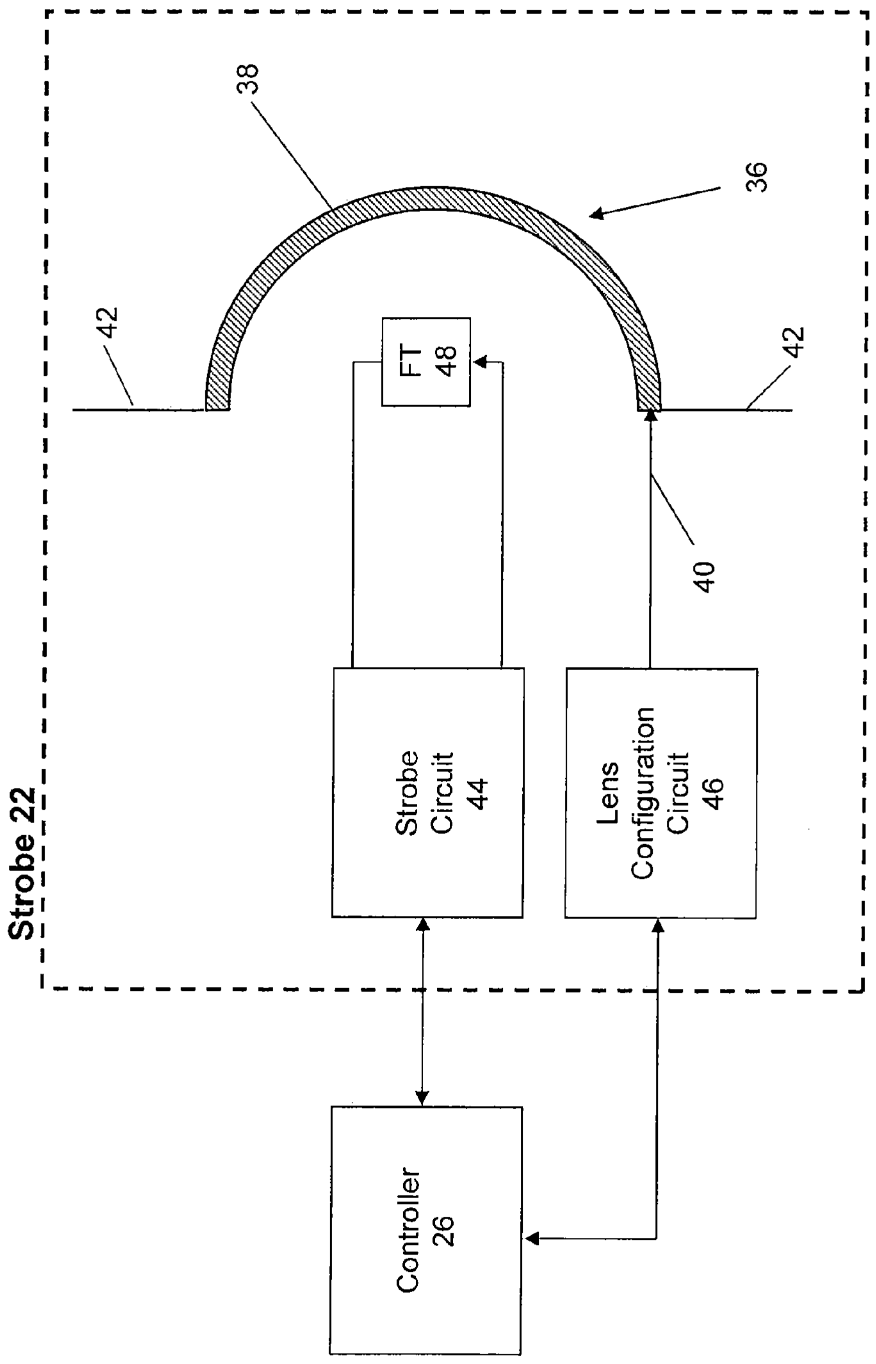
FIG. 4 illustrates the strobe using the electrically alterable lens depicted in FIG. 3 in order to configure the strobe to operate at one of the first wavelength band or the second wavelength band.

There are several methods in which the strobe 22 may be configured for a particular wavelength band. One method utilizes an electrically alterable layer 38 on the strobe lens 36, such as depicted in FIGS. 3 and 4. For example, the strobe lens 36 may comprise a liquid layer (such as 38) sandwiched between two layers of glass or other suitable material. Alternatively, a film (instead of a liquid layer) may be used, comprising a treated material applied to the film or a chemical layer between two films. The color of the strobe lens 36 may be controlled via a control wire 40 attached to the layer. For example, the liquid layer 38 may be heated using control wire 40, causing a molecular change in the liquid, and thereby allowing different light wave lengths to pass and to be blocked. Alternatively the color of the strobe lens could be altered by a current flowing through the film layer via control wire 40, causing a molecular change in the film allowing different light wavelengths to pass and to be blocked. Thus, the control wire 40 may cause tinting or shading of the strobe lens 36.

A command indicating a particular wavelength band may be received at the controller 26 (either via a manual input or via the control panel 14). The controller 26 may send a signal to the lens configuration circuit 46 indicating the wavelength band or color for the strobe lens 36. Based on the signal from the controller 26, the lens configuration circuit 46 may generate a control signal and send it on the control wire 40. The control wire 40 may then be used to change the color of the strobe lens 36 from clear to amber or amber to clear. Though amber and clear colors are described, other colors may be used as well. Further, as shown in FIG. 4, the strobe 22 may only consist of a single flash tube 48 and a single strobe circuit 44 to drive the flash tube 48. Thus, the electronics necessary for the strobe 22 are less than a traditional strobe that requires multiple flash tubes and strobe circuits to output light at different wavelengths.

The command to configure the strobe lens may be received at the strobe device 30 along with the command to activate the strobe 22. In that instance, the controller 26 may first configure the strobe lens 36, and then immediately thereafter activate the strobe (such as by sending a command to the strobe circuit 44, which in turn, activates the flash tube 48. Or, the command to configure the strobe lens may be received at the strobe device 30 before the command to activate the strobe 22. In that instance, the command to configure the strobe lens 36 may be implemented immediately upon receipt at the strobe device 30. Or, the command may be stored and implemented thereafter (such as when a subsequent command to activate the strobe is received). For example, a control signal may be sent (such as in a broadcast to multiple strobes 22 that are non-addressable) in which the control signal is a predetermined pattern indicative of the wavelength band for output on the multiple strobes 22.

Figure 5:
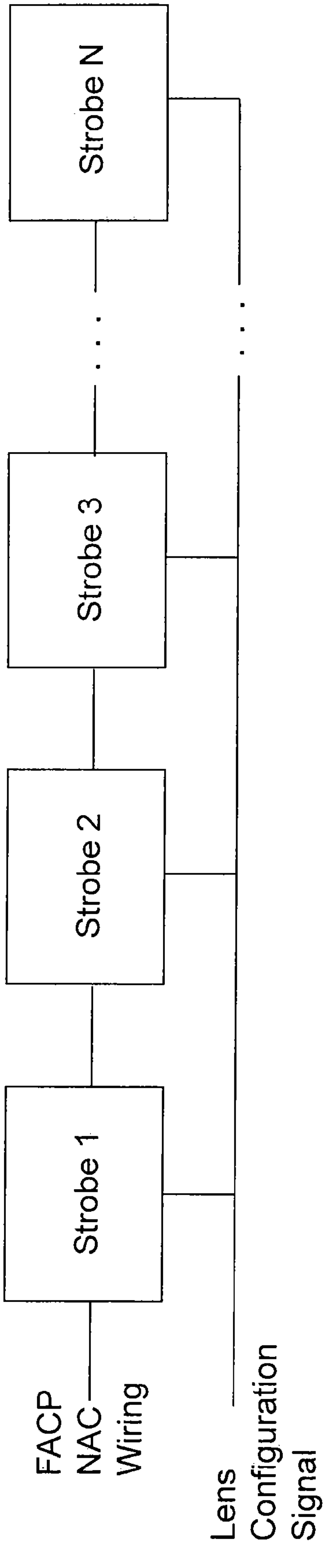
FIG. 5 is a schematic diagram illustrating a system in which the alarm system notification devices are not individually addressable.

In strobe devices that are addressable, this process of changing the color of the strobe lens 36 may be initiated via communications from the control panel 14. In a non addressable strobe device, this process of changing the color of the strobe lens 36 may be initiated via an additional wire from the control panel, as described in more detail below with respect to FIG. 5.

Another method utilizes a mechanically movable lens, such as one or more retractable lenses or filters. For example, a first lens (such as a clear lens) may be stationary (e.g., non-movable) and a second lens (such as an amber lens) may be movable, such as inserted or retraced behind the first lens in order to convert the light output from the strobe from one color to another (white to amber and back to white). As another example, both the first and second lenses may be movable.

Figure 6:
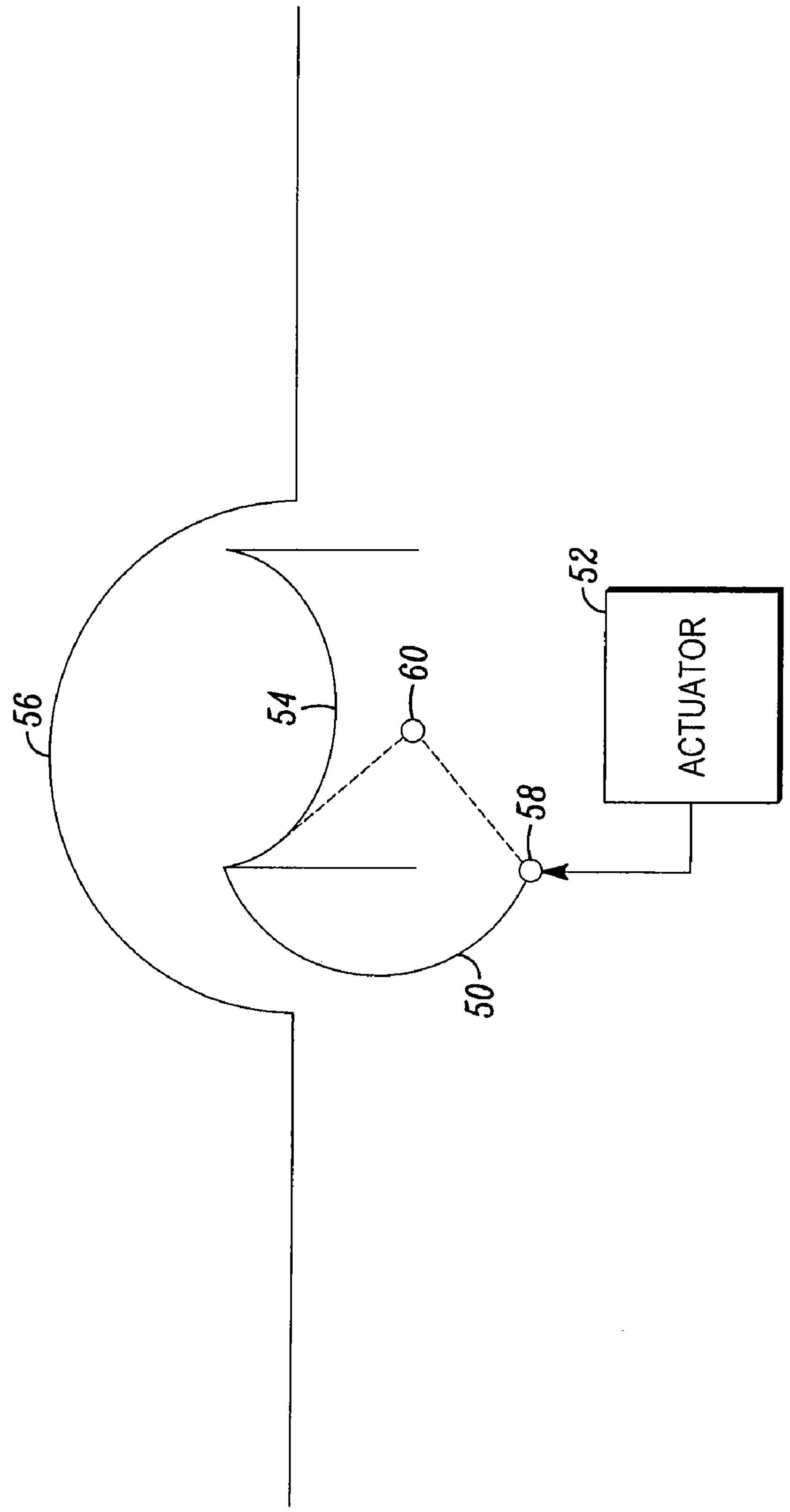
FIG. 6 illustrates using one or more movable or retractable lenses or filters in order to configure the strobe to operate at one of the first wavelength band or the second wavelength band.

FIG. 6 illustrates using a movable or retractable lens 50 in order to configure the strobe to operate at one of the first wavelength band or the second wavelength band. Similar to FIGS. 3 and 4, a command indicating a particular wavelength band may be received at the controller 26 (either via a manual input or via the control panel 14). The attachment point of the retractable lens 50 may be located at a lower edge to hide the driving mechanism below the reflection level. The retractable lens 50 may retract below the reflector 54 to prevent any interference with light output from the amber lens in its retracted position or the driving mechanism.

The controller 26 may then send a signal to the actuator 52 (such as a solenoid, or motor), depending on the particular command and depending on the current configuration of the strobe 22. For example, if the received command is for an amber light output and the current configuration of the strobe is that the amber lens is retracted, the controller 26 may send a command to the actuator 52 to move the retractable lens 50 to be proximate to the clear lens 56 or to move a filter to cover or envelop the lamp. In particular, activating the actuator may result in pivoting the retractable lens 50, using the solenoid engagement point 58 and the pivot point 60 (as shown in FIG. 6), thereby causing the retractable lens 50 to slide into place. Turning off the actuator 52 may result in the retractable lens to retract by pivoting at pivot point to the position shown in FIG. 6. A second actuator or a spring may be used to speed the movement of the retractable lens 50. As another example, if the received command is for an amber light output and the current configuration of the strobe is that the amber lens is extended, the controller 26 may send no command to the motor so that the lens 52 remains in its current position.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. An alarm system notification device comprising:

a single strobe, the single strobe configured to operate at a first wavelength band in a first configuration and at a second wavelength band in a second configuration, the first wavelength band being different from the second wavelength band;

an input selector configured to receive a configuration command, the configuration command indicative of one of the first wavelength band or the second wavelength band to operate the single strobe, the first wavelength band indicative of a first type of notification and the second wavelength band indicative of a second type of notification, the first type of notification being different from the second type of notification;

a communication port configured to receive an activation command from an alarm control panel; and a controller in communication with the input selector, the single strobe, and the communication port, the controller configured to:

receive the configuration command to select which of the first wavelength band or second wavelength band to operate the single strobe, in response to receiving the configuration command, configure the single strobe to a configured strobe state so that the single strobe operates at one of the first wavelength band in the first configuration or the second wavelength band in the second configuration as indicated in the configuration command, and in response to receiving the activation command, activate the single strobe in the configured strobe state.

2. The alarm system notification device of claim 1, wherein the input selector comprises a selector configured to receive manual input of the configuration command at the alarm system notification device.

3. The alarm system notification device of claim 1, wherein the alarm system notification device includes a unique address within an alarm system; and wherein the activation command from the alarm control panel includes the unique address for the alarm system notification device.

4. The alarm system notification device of claim 1, wherein the alarm system notification device is non-addressable within an alarm system;

wherein the alarm system notification device comprises one of a plurality of alarm system notification devices in the alarm system; and wherein the activation command from the alarm control panel commands a plurality of alarm system notification devices in the alarm system.

5. The alarm system notification device of claim 1, wherein the strobe comprises a single flash element and a lens;

wherein the first configuration comprises a first lens configuration for the lens in order for the strobe to operate at a first wavelength band and the second configuration comprises a second lens configuration for the lens in order for the strobe to operate at a second wavelength band; and wherein the single flash element is used in both the first configuration and the second configuration.

6. The alarm system notification device of claim 5, wherein the first lens configuration consists of a clear lens; and wherein the second lens configuration comprises at least a colored lens.

7. The alarm system notification device of claim 6, wherein the controller, in response to receiving the configuration command indicative of the second configuration, generates a command to mechanically move the colored lens to be adjacent to the clear lens.

8. The alarm system notification device of claim 5, wherein the lens comprises an electrically alterable layer based on an input control wire in control of the electrically alterable layer;

wherein the electrically alterable layer in the first lens configuration is substantially clear; and wherein the electrically alterable layer in the second lens configuration is colored.

9. The alarm system notification device of claim 1, wherein the first wavelength band comprises a white light band and the second wavelength band comprises an amber colored band.

10. A method of controlling light output from an alarm system notification device, the alarm notification device comprising a single strobe configured to operate at a first wavelength band in a first configuration and at a second wavelength band in a second configuration, the first wavelength band being different from the second wavelength band, the method comprising:

receiving, by the alarm system notification device, a configuration command, the configuration command comprising data indicative of one of the first wavelength band or the second wavelength band to operate the single strobe, the first wavelength band indicative of a first type of notification and the second wavelength band indicative of a second type of notification, the first type of notification being different from the second type of notification;

selecting, by the alarm system notification device, which of the first wavelength band or second wavelength band to operate the single strobe based on the configuration command input;

in response to receiving the configuration command, configuring, by the alarm system notification device, the single strobe to a configured strobe state so that the single strobe operates at one of the first wavelength band in the first configuration or the second wavelength band in the second configuration as indicated in the configuration command;

receiving an activation command from an alarm control panel; and in response to receiving the activation command, activating the single strobe in the configured strobe state.

11. The method of claim 10, wherein receiving the configuration command comprises manually inputting the configuration command at the alarm system notification device.

12. The method of claim 11, wherein the alarm system notification device includes a unique address within an alarm system; and wherein the activation command from the alarm control panel includes the unique address for the alarm system notification device.

13. The method of claim 11, wherein the alarm system notification device is non-addressable within an alarm system;

wherein the alarm system notification device comprises one of a plurality of alarm system notification devices in the alarm system; and wherein the activation command from the alarm control panel commands a plurality of alarm system notification devices in the alarm system.

14. The method of claim 11, wherein the strobe comprises a single flash element and a lens;

wherein the first configuration comprises a first lens configuration for the lens in order for the strobe to operate at a first wavelength band and the second configuration comprises a second lens configuration for the lens in order for the strobe to operate at a second wavelength band; and wherein the single flash element is used in both the first configuration and the second configuration.

15. The method of claim 14, wherein the first lens configuration consists of a clear lens; and wherein the second lens configuration comprises at least a colored lens.

16. The method of claim 15, wherein the controller, in response to receiving the configuration command indicative of the second configuration, generates a command to mechanically move the colored lens to be adjacent to the clear lens.

17. The method of claim 14, wherein the lens comprises an electrically alterable layer based on an input control wire in control of the electrically alterable layer;

wherein the electrically alterable layer in the first lens configuration is substantially clear; and wherein the electrically alterable layer in the second lens configuration is colored.

18. The method of claim 10, wherein the first type of notification comprises a fire alarm notification.

19. An alarm system notification device comprising:

a single strobe, the single strobe configured to operate at a first wavelength band in a first configuration and at a second wavelength band in a second configuration, the first wavelength band being different from the second wavelength band;

a memory for storing a configuration status of the single strobe, the configuration status indicative of the first configuration or the second configuration;

a communication port configured to receive a reporting command from an alarm control panel; and a controller in communication with the single strobe, the memory, and the communication port, the controller configured to:

configure the single strobe to the configuration status;

in response to receiving the reporting command, send a communication via the communication port to the alarm control panel, the communication indicative of the configuration status.

20. The alarm system notification device of claim 19, wherein the first wavelength band comprises a white light band and the second wavelength band comprises an amber colored band.

21. The alarm system notification device of claim 1, wherein the first type of notification comprises a fire alarm notification.

22. The alarm system notification device of claim 21, wherein the second type of notification is mass notification.

23. The method of claim 18, wherein the second type of notification is mass notification.

24. An alarm system notification device comprising:

a single strobe, the single strobe configured to operate in a fire alarm notification configuration and a mass notification configuration;

an input selector configured to receive a configuration command, the configuration command indicative of one of the fire alarm notification configuration or the mass notification configuration;

a communication port configured to receive an activation command from an alarm control panel; and a controller in communication with the input selector, the single strobe, and the communication port, the controller configured to:

receive the configuration command to select which of the fire alarm notification configuration or mass notification configuration to operate the single strobe, in response to receiving the configuration command, configure the single strobe to a configured strobe state so that the single strobe operates in the fire alarm notification configuration or in the mass notification configuration as indicated in the configuration command, and in response to receiving the activation command, activate the single strobe in the configured strobe state.

* * * * *